US007070255B2

(12) United States Patent
Nakajima

(10) Patent No.: US 7,070,255 B2
(45) Date of Patent: Jul. 4, 2006

(54) CAPPING MEMBER, CLEANING MEMBER, PIPING MEMBER, INK TANK MEMBER, AND UV CURABLE INK JET RECORDING APPARATUS FITTED WITH THE ABOVE MEMBERS

(75) Inventor: Atsushi Nakajima, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 211 days.

(21) Appl. No.: 10/730,478

(22) Filed: Dec. 8, 2003

(65) Prior Publication Data

US 2004/0113971 A1 Jun. 17, 2004

(30) Foreign Application Priority Data

Dec. 13, 2002 (JP) ............................ 2002-362145

(51) Int. Cl.
*B41J 2/165* (2006.01)
*B41J 2/175* (2006.01)
*G01D 11/00* (2006.01)

(52) U.S. Cl. .......................... 347/29; 347/85; 347/100

(58) Field of Classification Search ............ 347/22-35, 347/100, 85

See application file for complete search history.

(56) References Cited

U.S. PATENT DOCUMENTS 6,478,402 B1 * 11/2002 Greive ........................ 347/30

FOREIGN PATENT DOCUMENTS

| | | |
|---|---|---|
| JP | 02-289357 | 11/1990 |
| JP | 03-108556 | 5/1991 |
| JP | 05-201014 | 8/1993 |
| JP | 06-039466 | 2/1994 |

* cited by examiner

*Primary Examiner*—Shih-wen Hsieh
(74) *Attorney, Agent, or Firm*—Lucas & Merchanti, LLP

(57) ABSTRACT

An ink jet recording apparatus is disclosed. The apparatus includes a UV ink jet recording head fitted with a nozzle to eject UV ink; a capping member to cap an ejection plane of the nozzle; a cleaning member which comes into contact with the ejection plane of the nozzle to clean the ejection plane of the nozzle; a piping member to supply a UV ink to the UV ink jet recording or to discharge the UV ink; and an ink tank member to supply the UV ink to the UV ink jet recording head or store discharge ink, in which apparatus, a weight variation ratio of at least one of the capping member, the cleaning member, the piping member and the tank member, which is determined by an immersion test in the UV ink, is less than 50 percent.

13 Claims, 4 Drawing Sheets

CAPPING MEMBER, CLEANING MEMBER, PIPING MEMBER, INK TANK MEMBER, AND UV CURABLE INK JET RECORDING APPARATUS FITTED WITH THE ABOVE MEMBERS

The present invention relates to various types of members for an ink jet printer which forms images by ejecting UV curable ink, and an ink jet recording apparatus employing these, and in more detail, to members which are treated to improve corrosion resistance from the aforesaid UV curable ink and an ink jet recording apparatus employing the aforesaid members.

BACKGROUND OF THE INVENTION

In an ink jet recording system, methods are available in which various inks such as an aqueous ink, an oil ink, a solvent ink, or a UV curable ink is used.

In recent years, an actinic radiation curable ink jet recording system has received specific attention as a method in which images are formed on a substrate which exhibits low ink absorbability. The aforesaid ink jet recording system includes a solvent type in which reactive monomers are diluted by adding water, aqueous solvents, or various organic solvents, and a solvent-free type in which no solvents remain after curing. In recent years, the solvent-free type ink has received wide attention considering the background in which zero VOC has been demanded.

Known as actinic radiation curable inks which are cured by exposure to actinic radiation such as ultraviolet radiation or electron beams are radically polymerizable inks comprised of acrylate monomers as a main component and cationically polymerizable ink comprised of epoxy monomers or oxetane monomers as a main component.

Many printers are now commercially available which employ aqueous ink, oil ink or solvent ink. By employing these inks, embodiments are known which display sufficient durability.

With regard to ink jet printers employing aqueous ink, various types of suitable members are reported in many publications. For example, Patent Document 1 describes hydrogenated nitrilobutadiene rubber as a blade member, while Patent Document 2 describes ether based polyurethane rubber. Further, in Patent Document 3, a water repellent member is employed as a capping member while in Patent Document 4, employed as a piping member is polypropylene which is produced employing an inventive method.

However, acrylate monomers, epoxy monomers or oxetane monomers, which are employed in actinic radiation curable ink, exhibit properties which are markedly different from dilution solvents employed in conventional aqueous ink, oil ink and solvent ink. As a result, with regard to cleaning of ink jet heads, liquid transfer, and ink storage, and especially durability over an extended period of time, many problems have surfaced. Monomers exhibit properties similar to plasticizers employed as a plastic additive and are easily compatible with many plastics. Consequently, when conventionally employed members are used which come into contact with these inks, it is impossible to exhibit the desired functions due to modification by the actinic radiation curable ink.

These monomers tend to markedly dissolve and swell composition members employed in the liquid transfer system, compared to conventional dilution solvents. As a result, problems have occurred such as degradation of capping properties, degradation of cleaning properties, degradation of liquid transfer properties, and ink tank deformation.

Further, it was discovered that depending on the type of dissolving-out components, problems occurred in which ink jet nozzles were clogged and the rate of curing caused by actinic radiation decreased.

Particularly, even though cationically polymerizable ink comprised of epoxy monomers, oxetane monomers, or vinyl ether monomers exhibits advantages with regard to unpleasant odor, speed, and adhesion onto the substrate, problems have occurred in which dimensions and hardness of members vary due to marked corrosion and swelling of various plastic members.

(Patent Document 1) Specification of Japanese Patent No. 2741788

(Patent Document 2) Specification of Japanese Patent No. 2834949

(Patent Document 3) Specification of Japanese Patent No. 2688258

(Patent Document 4) Specification of Japanese Patent Publication No. 6-39466

SUMMARY OF THE INVENTION

An objective of the present invention is to provide a member which exhibits improved corrosion resistance against actinic radiation curable ink and is capable of assuring capping properties, cleaning properties, liquid transfer properties of piping members and ink tanks, and dimensional stability, as well as an ink jet recording apparatus employing the same.

The aforesaid objective of the present invention is achieved employing the means described below.

1. An ink jet recording apparatus comprising:

a UV ink jet recording head fitted with a nozzle to eject UV ink;

a capping member to cap an ejection plane of the nozzle;

a cleaning member which comes into contact with the ejection plane of the nozzle to clean the ejection plane of the nozzle;

a piping member to supply a UV ink to the UV ink jet recording head or to discharge the UV ink; and an ink tank member to supply the UV ink to the UV ink jet recording head or store discharged ink, wherein a weight variation ratio of at least one of the capping member, the cleaning member, the piping member and the tank member, which is determined by an immersion test in the UV ink, is less than 50 percent.

2. The ink jet recording apparatus described in 1. above, wherein the weight variation ratio of the capping member is less than 50 percent.

3. The ink jet recording apparatus described in 2. above, wherein the capping member comes into contact with the ejection plane of the nozzle of the UV ink jet recording head or a member which is located on the same plane as the ejection plane of the nozzle.

4. The ink jet recording apparatus described in 1. above, wherein the weight variation ratio of the cleaning member is less than 50 percent.

5. The ink jet recording apparatus described in 1. above, wherein the weight variation ratio of the piping member is less than 50 percent.

6. The ink jet recording apparatus described in 1. above, wherein the weight variation ratio of the tank member, is less than 10 percent.

7. The ink jet recording apparatus described in 1. above, wherein at least a part of the capping member, the cleaning member, the piping member or the tank member is composed of a copolymer in which all side chains are perfluoroalkyl or perfluoroalkoxy group.

8. The ink jet recording apparatus described in one of 1. through 7. above, which further comprises a UV radiation source.

9. A capping member to cap an ejection plane of the nozzle of a UV ink jet recording head, wherein a weight variation ratio of the capping member, which is determined by an immersion test in the UV ink, is less than 50 percent.

10. The capping member described in 8. above, wherein the capping member comes into contact with the ejection plane of the nozzle of the UV ink jet recording head or a member which is located on the same plane as the ejection plane of the nozzle.

11. A cleaning member which comes into contact with the ejection plane of the nozzle of a UV ink jet recording head fitted with a nozzle to eject UV ink and carries out cleaning of the ejection plane of the nozzle, wherein a weight variation ratio of the cleaning member, which is determined by an immersion test in the UV ink, is less than 50 percent.

12. A piping member supplying UV ink to a UV ink jet recording head fitted with a nozzle to eject the UV ink or to discharge it, wherein a weight variation ratio of the piping member, which is determined by an immersion test in the UV ink, is less than 50 percent.

13. An ink tank member supplying UV ink to a UV ink jet recording head fitted with a nozzle to eject the UV ink or storing discharged ink, wherein a weight variation ratio of the ink tank member, which is determined by an immersion test in the UV ink, is less than 10 percent.

14. An ink jet recording apparatus comprising:

a UV ink jet recording head fitted with a nozzle to eject UV ink;

a capping member to cap an ejection plane of the nozzle;

a cleaning member which comes into contact with the ejection plane of the nozzle to clean the ejection plane of the nozzle;

a piping member to supply a UV ink to the UV ink jet recording head or to discharge the UV ink; and an ink tank member to supply the UV ink to the UV ink jet recording head or store discharged ink, wherein at least a part of the capping member, the cleaning member, the piping member or the tank member is composed of a copolymer in which all side chains are perfluoroalkyl or perfluoroalkoxy group.

The UV ink is preferably cationically polymerizable.

DETAILED DESCRIPTION OF THE INVENTION

The present inventions will now be detailed.

Of ink jet recording methods employing an actinic radiation curable ink, particularly, a method employing an ultraviolet radiation curable ink is utilized in wide fields such as offset printing, gravure printing, screen printing, letterpress printing or ink jet printing due to rapid drying, excellent environmental friendliness due to the absence of volatile solvents, and printability on various substrates.

It is required to control the viscosity of ink. Even though a piezoelectric type head which results in relatively wide ink applicability is employed, in order to apply it to flexographic printing or an ink jet system, the viscosity of ink is customarily controlled to be between 2–30 mPa·s and preferably between 3–20 Pa·s. A solvent-free ultraviolet radiation curable ink (hereinafter also referred to as a UV ink) exhibits high viscosity at normal temperature. As a result, an ink jet recording apparatus employing such inks is commonly fitted with a heating means as well as an ink temperature stabilizing means, and the ink is heated to 30–150° C. (preferably to 40–100° C.). Further, it is necessary to maintain constant ink temperature. In order to result in desired recording performance, it is essential to control the temperature of the recording head, and if desired, other ink tank piping, capping, and cleaning members are also heated.

It is difficult to eject a high viscosity ink at 30° C. or less and 150° C. or more due to the large variation range of viscosity. Further, viscosity variation directly affects the size as well as the ejection rate of liquid droplets, resulting in degradation of image quality. As a result, ink temperature is set preferably at the specified temperature ±2° C. and more preferably at the specified temperature ±1° C. Accordingly, in order to control the temperature, a plurality of thermal sensors is provided in each of the piping positions, and heating is controlled depending on the ink flow rate and the ambient temperature.

Further, after printing employing the recording head, since it is required to cure ink through exposure to ultraviolet radiation, an ultraviolet radiation source is provided together with the recording head.

Figure 1:
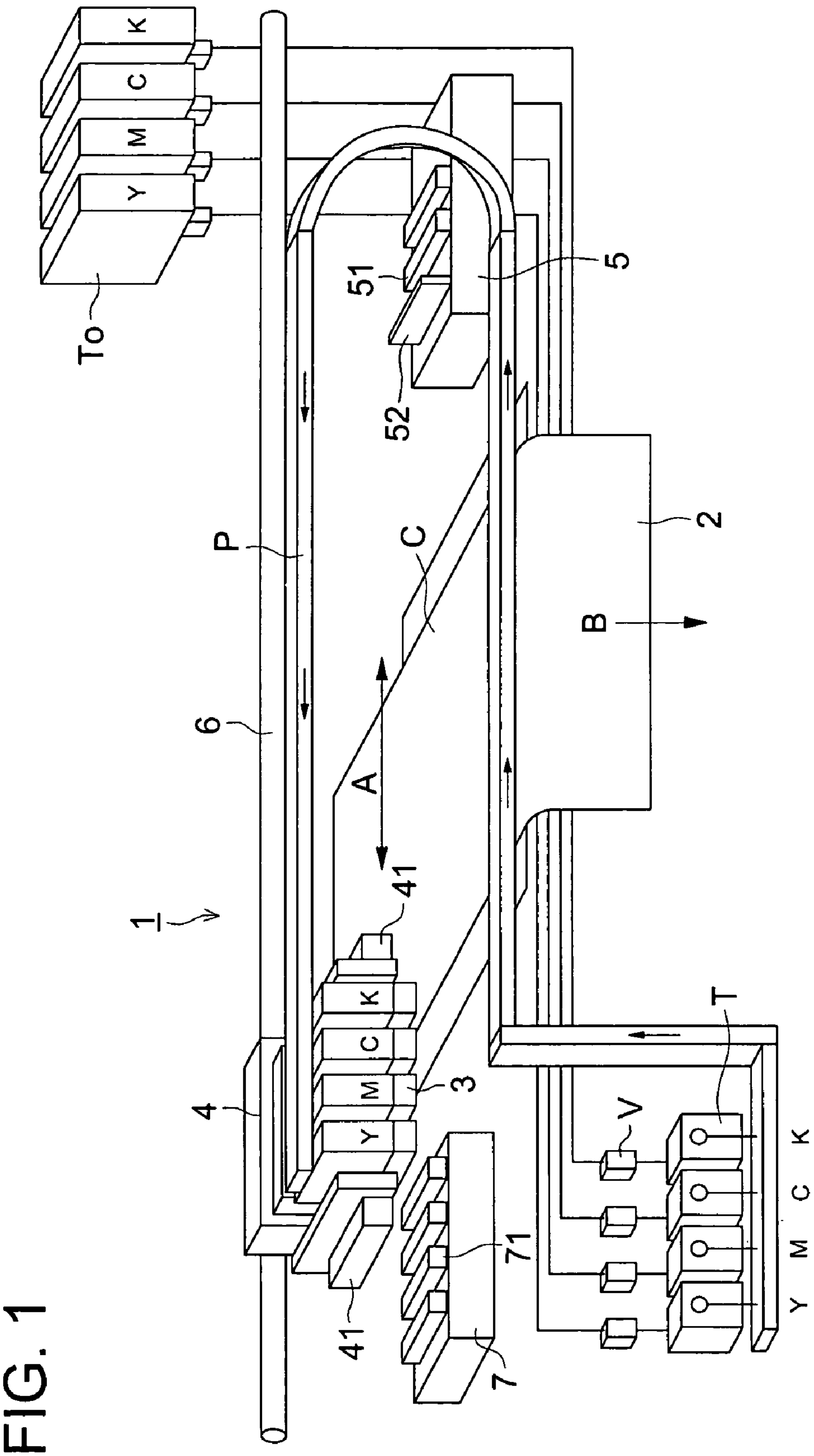
FIG. 1 is a schematic view showing one example of the main structure of ink jet recording apparatus 1 according to the present invention.

FIG. 1 is a schematic view showing one example of the major structure of ink jet recording apparatus 1 according to the present invention. In the ink jet recording apparatus according to the present invention, printing is carried out by ejecting ink on recording materials such as substrates of minimized ink absorption such as plastic film, printing paper provided with no ink absorbability, and substrates comprised of metals, wood, and glass. The aforesaid recording apparatus is comprised of a conveyance means (not shown) to forewardly convey substrate 2 during printing, a plurality of recording heads 3 which ejects ink of each color (yellow (Y), magenta (M), cyan (C), and black (K)), as appropriate, carriage 4 which houses UV radiation source 41 (being a radiation exposure means) which exposes ultraviolet radiation to aforesaid substrate 2 to cure each ink of a plurality of aforesaid inks ejected from recording head 3, capping member 51 which enables suction and maintenance unit 5 comprising cleaning member 52 which performs maintenance of aforesaid recording head 3, guide rail 6 which guides carriage 4 in the horizontal direction (double arrowed A) during printing or maintenance, home position 7 having moisture retention cap 71 which is used for standby of aforesaid carriage 4, and a control section (not shown) which regulates each of these sections. T.sub.0 represents an ink tank for ink supply. Each ink conveyed from aforesaid tank $T_0$ via supply valve V is temporarily stored in sub-tank T and then conveyed to the recording head and ink supply channel P.

Sub-tank T is an intermediate tank which is commonly provided in a position lower than the recording head to control the back pressure of ink in the recording head. Listed as intermediate tanks other than this are an intermediate damper (even though not shown) which is provided near the recording head and functions as a damper to relax the abrupt change of ink back pressure due to movement of the carriage during scanning and after scanning, and the like.

To accomplish printing and UV exposure, the conveyance means conveys substrate 2 to printing (image forming) region C while synchronizing with operation of carriage 4, wherein printing is carried out in response to image signals, employing ink ejected from the recording head and subsequently, ultraviolet radiation is provided employing UV radiation source 41. After completion, substrate 2 is conveyed downwardly (arrow B) from the printing region.

Further, though not shown, substrate 2, which has been printed while scanned and exposed to UV radiation, may be further exposed to radiation employing a second radiation source which is installed in the substrate conveyed downstream position.

The recording head comprises a head substrate, a major ink ejection section, a temperature monitoring thermal sensor (being a temperature measuring means) which monitors temperature in the position near the aforesaid major ink ejection section, and an outlet sensor which detects clogging of the outlet and is connected to a flexible cable which transmits signals to the aforesaid major ink ejection section as well as the sensor. On the ink ejection plane of the major ink ejection section, a plurality of ink ejection outlets is provided along with the center line of the ink ejection plane while facing substrate 2, and ejection outlets are passed through ink nozzles (flow channels). Further, the recording head, the ink channels in the recording head, or piping, especially the recording head, when related to the present invention, are enabled to be kept warm or heated so that ink fluidity is maintained, as described above.

Figure 2:
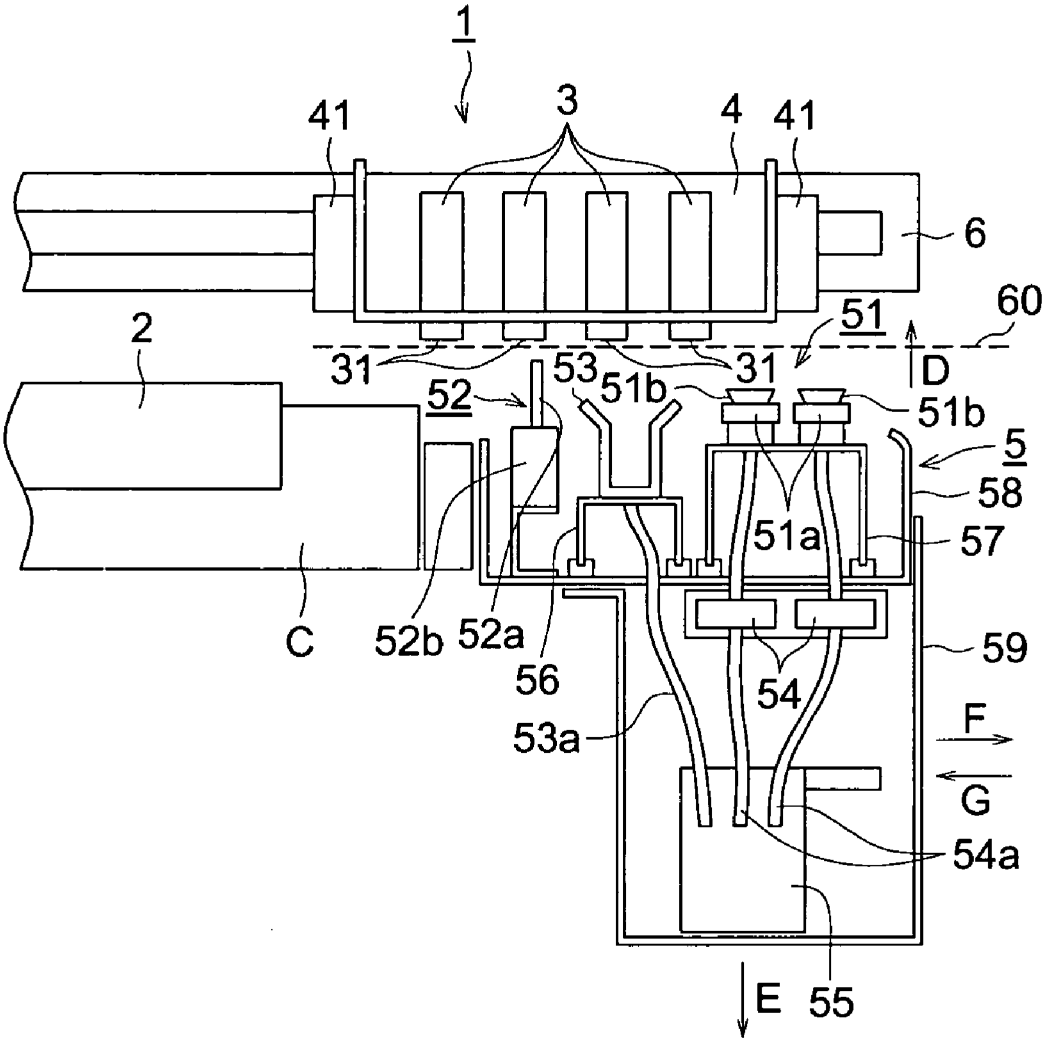
FIG. 2 is a view showing a state in which a carriage faces a maintenance unit.

FIG. 2 shows a carriage fitted with recording head 3 as well as UV radiation source 41 and maintenance unit 5, under a state in which the maintenance unit faces the recording head.

UV radiation sources 41 are provided at both ends of the carriage, and the plane of recording head 3, which faces substrate 2 of the recording head, is provided with ink ejection plane 31 comprising a plurality of ink outlets.

Further, the maintenance unit comprises capping member 51 which covers ejection outlets on ejection plane 31 and carries out ink suction from the outlets, and cleaning member 52 which is comprised of blade 52*a* and ink absorbing body 52*b* which wipe any remaining ink on ejection plane 31 after ink suction, employing aforesaid capping member 51.

A plurality of capping members 51 (two in the present embodiment) for ink suction is arranged in line, which makes it possible to simultaneously suck a plurality of recording heads 3 during maintenance.

The control section initiates maintenance of recording head 3 after it performs the specified amount of image formation on substrate 2, after any of the outlet sensors detect clogging of an outlet, or when power is applied to ink jet recording apparatus 1, as initiation timing.

At the initiation of maintenance, as shown in FIG. 2, the control section controls carriage 4 and enables ejection plane 31 to face capping member 51. Thereafter, the control section controls movement means so that maintenance unit 5 moves upward (arrow D) until capping member 51 tightly seals ejection plane 31 of the recording head.

Figure 3:
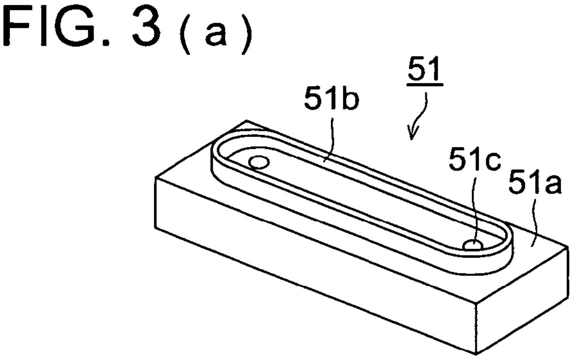
FIG. 3 is a view showing a state in which a capping member is brought into close contact with ejection plane 31, resulting in sealing.
Figure 3:
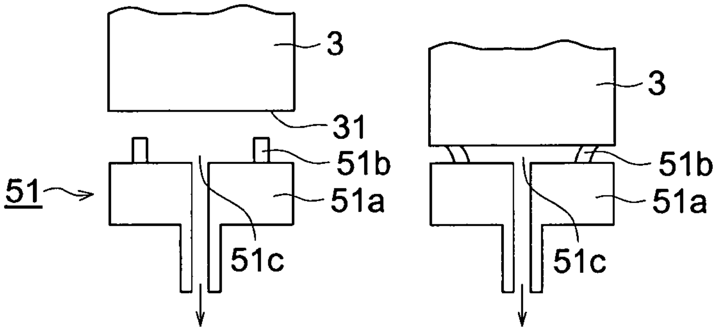

FIG. 3 shows the above state. FIG. 3(*a*) is a perspective view of capping member 51 which is comprised of capping member base body 51*a*, cap wall section 51*b*, and through hole 51*c* which leads ink to waste ink tank 55 via ink suction pump 54. Further, FIG. 3(*b*) is a view in which the capping member is allowed to face ink ejection plane 31 of the recording head, and is also a sectional view of the close seal of maintenance unit 5 which moves upward (arrow D) so that ejection plane 31 is brought into close contact with the capping member. The cap wall section is preferably comprised of elastic materials which can be brought into close contact with the ejection plane. As noted above, the capping member is brought into contact with ejection plane 31 while surrounding the ejection outlets of recording head 3 while being subjected to elastic modification.

When capping member 51 covers the ejection outlet of recording head 3 and seals ejection plane 31, the control section controls suction pump 54 so that ink is sucked from the ejection outlet via capping member 51. The suctioned ink is allowed to flow to waste (recovery) ink tank 55 through piping 54*a*.

When suction is completed, the movement means brings maintenance unit 5 downward (arrow E) so that ejection plane 31 of recording head 3 is positioned lower than the tip of capping member 51, whereby capping member 51 is separated from ejection plane 31.

When capping member 51 is completely separated, the control section controls carriage 4 so that recording head 3 is stopped at the current position and simultaneously controls the movement means so that maintenance unit 5 moves in the right direction (arrow F).

Figure 4:
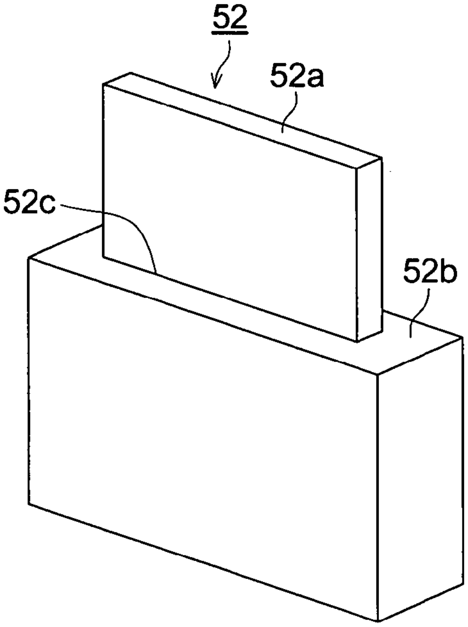
FIG. 4 is a schematic view showing one example of the structure of cleaning member 52.

During the aforesaid movement, blade 52*a* of cleaning member 52 slides ejection plane 31 and passes through recording head 3 while wiping ink and cleaning ejection plane 31. In such a case, blade 52*a* is subjected to elastic deformation to completely clean ejection plane 31. By doing so, residual ink on ejection plane 31 is removed and adhered to the sliding surface of blade 52*a*. Further, ink adhered onto blade 52*a* flows down toward absorbing body 52*b* and is absorbed by absorbing body 52*b*. FIG. 4 shows one example of cleaning member 52 which comprises blade 52*a*, ink absorbing body 52*b* which absorbs wiped ink and absorbing body opening section 52*c* to which blade 52*a* is fixed.

When ejection plane 31 is cleaned, maintenance unit 5 moves downward (arrow E in FIG. 2) so that ejection plane 31 of recording head 3 is higher than the leading edge of the blade. Thereafter, maintenance unit 5 moves in the left direction (arrow G in FIG. 2) so that ejection plane 31 of recording head 3 faces ink receptive section 53.

When ejection plane 31 of recording head 3 faces ink receptive section 53, the control section controls recording head 3 so that no ink is ejected from the ejection outlet to ink receptive section 53 and the ejection state of the ejection outlet is returned.

Ink receptive section 53 is arranged between capping member 51, in maintenance unit 5, and cleaning member 52. In aforesaid ink receptive section 53, arranged is recovery pipe 53*a* which allows accumulated ink to flow into recovery tank 55.

When maintenance of recording head 3 is completed, the control unit controls the movement means so that maintenance unit 5 returns to the specified position.

Further, in the maintenance unit, each of these sections is covered with light shielding covers 56, 57, 58, and 59, as well as light shielding shutter 60 so that discharged ink after maintenance is not cured in recovery pipes 53*a* and 54*a*, as well as in recovery tank 55 due to ultraviolet radiation radiated from UV radiation source 41.

Figure 5:
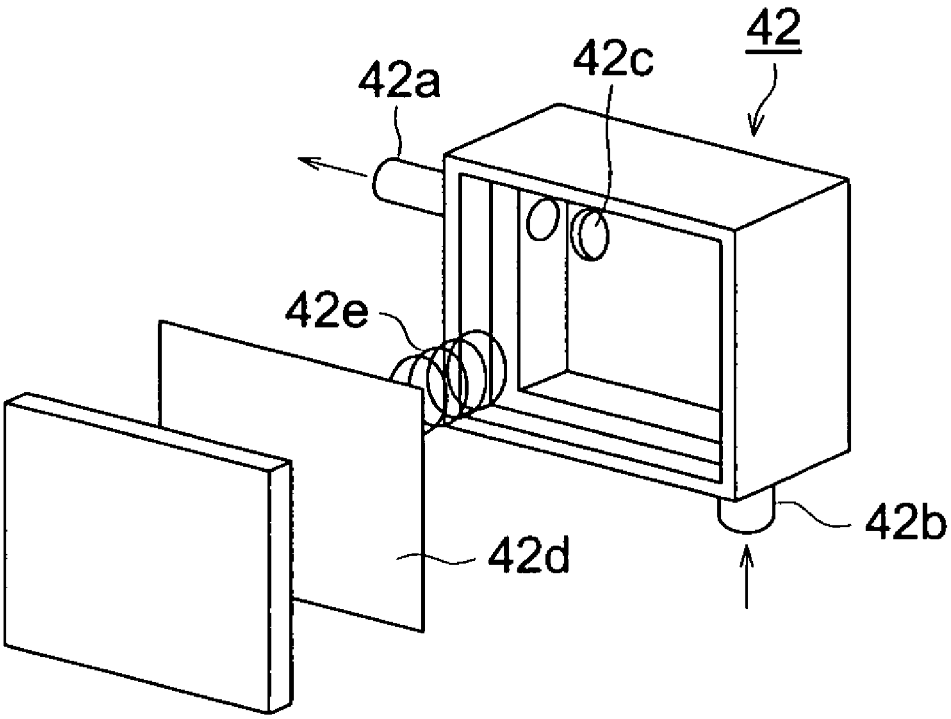
FIG. 5 is a view showing an example of the structure of an intermediate damper.

Still further, an intermediate tank (an intermediate damper, not shown in FIG. 1) is provided near the recording head to function as a damper to minimize the abrupt change of ink back pressure due to carriage movement during and after the aforesaid scanning. In FIG. 5, an example of a structure of the aforesaid intermediate damper is shown. The intermediate damper comprises intermediate damper body 42, ink outlet 42*a* on the recording head side, ink inlet 42*b* on the ink intermediate tank T side, filter member 42*c* provided on the ink outlet side, damper seal 42*d*, and coil spring 42*e* which holds this in the interior. The intermediate damper functions in such a way that ink pressure generated by acceleration of the carriage is absorbed and buffered by elasticity of the damper seal.

As shown in FIG. 1, carriage home position 7 is at one end of reciprocation motion of carriage 4. In aforesaid home position 7, provided are the same number of moisture retention caps 71 as on recording heads 3, which retain moisture of ejection plane 31 of recording head 3, and cover and seal ejection plane 31 of recording head 3 during stand-by of carriage 4.

It is preferable that moisture retention cap 7 is also comprised of ink resistant materials.

Any of suction pumps 54 as a suction means may be used as long as ink is suctioned from the ejection outlet. Examples include piston, cylinder, and tube pumps.

The control section (not shown) employed in the ink jet recording apparatus of the present invention is comprised of interface, ROM (Read Only Memory), RAM (Random Access Memory), and CPU (Central Processing Unit) and controls various types of units connected to interface based on control programs as well as control data written to the ROM.

The interface is electrically connected to recording heads 3, carriage 4, suction pumps 54, UV radiation sources 41, heating means, thermal sensors, outlet sensors, conveyance means, and movement means.

In ROM, written are various types of control programs and control data related to operation of each section of the ink jet printer.

RAM is capable of memorizing a plurality of inputted data only when electric power is supplied and is provided with a memory area which memorizes various data such as image data for image formation and a working area utilizing a CPU.

The CPU applies the specified programs among various types of programs stored in the ROM to the working area within the RAM and executes various types of processing based on the program in response to signals inputted from each sensor.

Ink employed in the present invention is one of high viscosity and as noted above, is heated at 30–150° C. employing a heating means.

Due to this fact, it is preferable that in order to control temperature, an ink jet recording apparatus is subjected to thermal control depending on the ink flow rate as well as ambient temperature by providing thermal sensors at each position of the piping sections. Further, it is also preferable that the recording head unit to be heated is thermally shielded or insulated so that it is not affected by temperature from the apparatus itself nor by ambient air. In order to decrease the rise time of printers required for heating and to decrease loss of heat energy, it is preferable to result in thermal insulation from other sections, allowing a decrease in the entire heat capacity of the heating unit.

In the ink jet recording apparatus according to the present invention, highly viscous, solvent-free UV curable ink is employed while heated to decrease its viscosity. UV ink which is subsequently cured by exposure to ultraviolet radiation is ejected to form images.

Further, ink itself comprises no solvents, but as a whole, ink comprised of oil media is employed. As a result, each member of the aforesaid ink jet recording apparatus is required to be solvent resistant.

Specifically, in the recording head which ejects ink, materials which exhibit high resistance to the ink are selected for the ink ejection body, as well as the ink ejection plane, such as a nozzle plate.

It was discovered that when a UV curable ink is employed, other than the aforesaid recording head, preferable combinations of the ink with materials of each member of the aforesaid ink jet recording material is allowed. Further, it was also discovered that each member demanded a different degree of ink resistance.

Namely, in the capping member shown in FIG. 2 but especially FIG. 3, when cleaning is carried out by suctioning ink under vacuum while, as noted above, the capping member is brought into close contact with the nozzle (the ink outlet) plane or the recording head member (an ejection plane) within the same plane as nozzles (ink ejection outlets), it is required that the capping member is subjected to flexible deformation and close contact to prevent air leaks. For example, when a UV curable ink swells the member of the aforesaid cap wall section, appropriate close contact is not achieved due to the variation of elastic modulus as well as size. When the weight variation ratio of these members which is determined by an immersion test in the ink employed in the aforesaid ink jet recording apparatus is less than 50 percent, the variation of elasticity as well as size is minimized whereby it is possible to results in sufficient suction capability when employed over an extended period. The aforesaid weight variation ratio is more preferably 0–30 percent. Cases of less than 0 percent indicate dissolving-out, whereby dissolved materials adversely affect ejection outlets (nozzles) of the recording head.

In the capping member according to the present invention, it is required that the member of the aforesaid cap wall section exhibits elasticity. Further, the weight variation ratio of the main body of the capping member, which is determined by the ink immersion test, is less than 50 percent.

In the present invention, ink employed in the ink jet recording apparatus is subjected to an immersion test at the employed temperature. Namely, when the employed temperature is 60° C., members employed for ink, such as capping members, are immersed for one week, and thereafter, any weight variation ratio is determined.

Examples of materials usable as a capping member include perfluoro type fluororesins such as FEP (tetrafluoroethylene-hexafluoropropylene copolymers), PFA (perfluoroalkyoxy resins; tetrafluoroethylene-perfluorinated alkyl vinyl ether copolymers), TFE (tetrafluoroethylene), and perfluoroelastomer, PE, PP, ethylene propylene rubber (EPM and EPDM), silicone rubber (Q), chlorosulfonated rubber (CSM), chlorinated polyethylene (CM), fluorine rubber (FKM), FEPM, FFKM, and nylons, polyesters such as PES and PBT, polyacetals, PI (polyimide), and SUS (stainless steel).

Herein, the classification and names of synthetic rubber are based on the classification specified in JIS K 6397.

Of these materials, those which are particularly preferred as members of the cap wall sections are fluoro rubbers such as FKM, FEPM, and FFKM. Of these, particularly preferred is FFKM which is a rubber copolymer in which all side chains are fluoro- or perfluoro-alkyl, or per-fluoroalkoxy groups comprised of C, F, and O atoms. FFKM is commercially available as perfluoro elastomers which include Daieruperfuro, manufactured by Daikin Industries, Ltd. as well as Kalrez manufactured by DuPont Co.

Hardness, as described herein, refers to hardness specified in JIS-6301-1962 Standard, and is preferably 80 degrees or less.

On the other hand, elasticity is not particularly required for the capping member main body which may be comprised of the aforesaid materials and the same having a higher degree of polymerization, as well as materials such as metal (e.g., stainless steel). A capping member main body may be formed employing SUS and employed as a cap wall material may be, for example, Daikin Daierulperflo, manufactured by Daikin Industries, Ltd., which is an elastic fluorine based elastomer as shown in FIG. 3, or O rings, comprised of the same material, may also be employed.

Cap member 51 may be formed employing other resins of which surface is coated with fluororesins. Herein, it is preferable that resins to be coated with fluororesins have been crosslinked so that hardness after coating is 20–100 (JIS-A). These resins include various rubber materials and thermoplastic elastomers, as for example, various rubber materials, plastic materials, and thermoplastic elastomers may be employed individually or in combinations. In such cases, various rubber materials, as described herein, are not limited and examples include ethylene propylene terpolymers (EPDM), styrene butadiene rubber, and urethane rubber. Polymers which are employed individually or in combination may be added with compounding chemicals such as a vulcanizing agent or a crosslinking agent, a vulcanization accelerator, a vulcanization acceleration aid, a filler, a plasticizer and an age resistor which are then vulcanized (or crosslinked).

Further, piping connected to a recovery tank via a pump to recover any ink suctioned by the aforesaid capping member may be comprised of any of the materials described above.

Still further, any cleaning member which is brought into contact with the ejection plane of the nozzle (ink outlet) of the recording head to achieve cleaning by scraping any excessive ink, when it is swelled, results in variation of the elastic modulus as well as of size in the same manner as the capping member. As a result, uniformly close contact with the ejection plane of the nozzle and appropriate pressing pressure are not obtained, whereby scraping performance is degraded. When the weight variation ratio of a member, which is determined by the ink immersion test, is less than 50 percent, variation of elasticity and dimensions decreases, possibly resulting in sufficient suction even though employed over an extended period of time. The aforesaid weight variation ratio is more preferably 0 to less than 30 percent. When it is less than 0 percent, nozzles are adversely affected by dissolved-out materials. Employed as members may be the same ones which are listed as capping members.

Of the aforesaid cleaning members, a blade is comprised of elastic materials. As a result, the elastic modulus of the aforesaid blade varies, and when degraded, cleaning characteristics are particularly affected. Accordingly, since rubber components which result in minimal degradation are particularly suitable for the blade, the same fluorine based elastomers, which have been listed for capping members, are suitable. Hardness of the blade is preferably 80 degrees or less, which is specified in JIS-6302-1962 Standard. When the aforesaid harness is more than 80 degrees, it becomes difficult to smoothly wipe the ink ejection plane during the aforesaid wiping operation.

Members which come into contact with ink are preferably solvent resistant, and ink absorbing bodies is comprised of the same materials as those listed for the aforesaid capping members. The ink absorbing body may be comprised of any material as long as they absorb ink. In the embodiment shown in FIG. 4, a sponge which is formed of the aforesaid materials is employed. Absorbing body 52*b* is formed to be rectangular parallelepiped, and opening section 52*c* is provided in the upper portion. Blade 52*a* is put into aforesaid opening section 52*c* and securely fixed, whereby absorbing body 52*b* is brought into contact with blade 52*a*, whereby it is possible to absorb ink adhered to blade 52*a*.

As described in the example shown in FIG. 4, in short, members which come into contact with ink must be comprised of materials at a volume variation ratio of less than 50 percent, as determined by the ink immersion test.

Partly described have been the piping members which lead ink suctioned by the capping member to the recovery tank. In addition, when any of ink supply channel P which supplies ink from aforesaid intermediate tank T to the recording head and the ink supply channel which supplies ink from ink tank $T_0$ to intermediate tank T is swelled by ink, dimensions vary. In such cases, standing stability of ink tends to be degraded due to an increase in permeability for oxygen and ambient air. Further, when piping is subjected to extreme curvature, problems occur in which liquid conveying pressure increases due to pipe bends especially during high speed movement of the carriage of the ink jet recording apparatus.

When the weight variation ratio of such piping members, which is determined by the aforesaid ink immersion test, is less than 50 percent, elasticity as well as dimensions results in minimal variation, whereby it is possible to achieve sufficient durability even when employed for an extended period of time. Further, the weight variation ratio is more preferably 0-less than 30 percent. When it is less than 0 percent, nozzles are adversely affected by dissolved-out materials.

Employed as materials may be the same types of materials listed as capping members. Particularly preferred are PE, PP, TFE (tetrafluoroethylene), PFA (perfluoroalkoxyresin; tetrafluoroethylene-fluorinated alkyl vinyl ether copolymers), PEP (tetrafluoroethylene-hexafluoropropylene copolymers), FFKM, FEPM, PI (polyimides), polyamide such as nylon, and SUS (stainless steel).

Further, employed as fixed piping members which do not require high elasticity may be metals such as aluminum or SUS as well as glass materials.

Still further, members which are employed for ink supply tank $T_0$ to store original ink, intermediate ink tanks such as intermediate ink tank T which is installed to control ink back pressure, an intermediate damper installed between the intermediate tank and the ink jet head for the purpose of the back pressure management of ink and a damper for pressure variation, and in addition, a waste (recovery) ink tank which stores discharged ink, preferably exhibit a weight variation ratio of less than 10 percent in the aforesaid immersion test in the employed UV ink. Dampers which absorb pressure variation are specifically required for ink resistance because these differ from the aforesaid members in holding a working portion. As a result, the weight variation ratio is preferably 0–8 percent. Of those listed as capping members, particularly employed may be ones which exhibit high immersion resistance. Preferably and advantageously employed are olefins such as PE or PP, FEP, PFA, FFKM, and nylon.

In the present invention, a UV curable ink is used. Known as UV curable ink jet ink compositions are photopolymerizable ink compositions employing radically polymerizable compounds having a radically polymerizable ethylenic unsaturated bond, such as compounds, for example, described in Japanese Patent Publication Open to Public Inspection No. 7-159983, Japanese Patent Publication No. 7-31399, Japanese Patent Publication Open to Public Inspection Nos. 8-224982 and 10-863, and Japanese Patent Application No. 7-231444 as well as cationic polymerization based photocurable resins. In the present invention, these may be employed. However, in the present invention, particularly preferably employed are ink compositions employing cationic photopolymerization type photocurable resins, for example, those described in Japanese Patent Publication Open to Public Inspection Nos. 6-43633 and 8-324137.

An actinic radiation curable ink comprises radically polymerizable monomers or catatonically polymerizable monomers in an amount of at least 70 percent by weight, non-reactive solvents in an amount of 0–5 percent by weight, and colorants. The present invention relates to materials such solvent-free inks or an ink comprising minimal solvent components.

Employed as various types of these monomers and colorants may be those disclosed in WO99/29787 and Japanese Patent Publication Open to Public Inspection No. 2001-220526. Other than these, it is possible to refer to these publications with regard to initiators and additives.

It is required to select, for each member, the aforesaid materials such as monomers including epoxy, oxetane, or vinyl ether employed for the aforesaid cationic polymerization, which exhibit high swellability for resins, especially for rubber.

Listed as high immersion resistant components suitable for these monomers are polyethylene, polypropylene, PET, PBT, nylon, TFE, PFA, FEP, perfluoroelastomers, SUS and PI. Of these, PET, PBT, nylon, TFE, PFA, FEP, perfluoroelastomers, SUS, and PI are particularly preferred.

Conventionally, even though employed in ink jet recording apparatuses employing an aqueous ink, listed as components which exhibit low immersion resistance for these cationically polymerizable monomers are, for example, acryls such as ABS, PEI (polyether imides), PVC (polyvinyl chloride), various plasticizer comprising plastics, and elastomers such as SBR (butadiene-acrylonitrile rubber), or urethane rubber. Elastomers, as described herein, are polymer substances with high elasticity at normal temperature, and elastomers such as SBR, NBR, or urethane rubber are easily swelled. Further, plasticizer containing plastics are not preferred due to problems in which plasticizers are dissolved out.

In the present invention, it is possible to employ various components in substrate 2 which result in recording media. When recording media are comprised of resins, various resinous films such as PET film, OPS film, OPP film, ONy film, PVC film, PE film, or TAC film are specifically employed. Other than these, employed as resins may be polycarbonates, acryl resins, ABS, plyacetals, PVA, and various kinds of rubber. In addition, employed may be fine-quality paper, matte paper, coated paper, art paper, printing paper, metals and glass.

Heretofore, since the surface energy of various these substrates differs markedly, problems have been pointed out in which dot diameter varies after ink deposition depending on materials. However, by employing the aforesaid ink, it is possible to form highly detailed images on a wide range of materials of a surface energy range of 35–60 dyn/cm, including OPP film as well as OPS film of a low surface energy to PET film of a relatively high surface energy.

From the viewpoint of cost of recording materials such as packaging expenses or production cost, print production efficiency, and adaptability to prints of various sizes, it is preferable to use a continuous web as a recording medium.

A conveyance means conveys substrate 2 to be a recording medium on image forming region C while synchronizing with the movement of carriage 4, and then conveys substrate 2 from aforesaid image forming region C in a downward direction (arrow B) corresponding to the completion of image formation.

A plurality of recording heads 3 is provided corresponding to the number of types of ink (yellow, magenta, cyan, and black) employed in ink jet printer 1. A system utilizing piezoelectric action of a piezoelectric body, which exhibits a wide application range for inks and is capable of achieving a high ejection rate, is applied to these recording heads 3. Specifically, for example, as described in Japanese Patent Publication Open to Public Inspection No. 4-48622, an electrode film is formed on the interior surface of fine grooves formed on a piezoelectric substrate and is covered with insulating materials.

Recording heads 3 eject ink in the range of 2–20 pl per dot. The diameter of dots formed on recording medium 2 employing recording heads 3 is customarily 30–200 μm, is preferably 30–150 μm, and is more preferably 30–120 μm.

Further, it is preferable that recording heads 3 eject ink so that total ink layer thickness after light exposure is 2–60 μm. In the actinic radiation curable ink jet recording in the screen printing field, the total ink layer thickness occasionally exceeds 20 μm. In the soft package printing field in which thin resinous materials are frequently employed as recording media, the total ink layer thickness is preferably at most 60 μm, because problems occur such as the aforesaid wrinkling, deformation, and curling of recording media, as well as changes of entire stiffness of recording media and the tactile feel of materials.

Further, as shown in FIGS. 1 and 2, recording heads 3, to which the aforesaid system applies, are provided with ejection outlets (not shown) which eject ink onto a substrate, ejection plane 31 arranged with a plurality of ejection outlets, and ejection outlet sensors (ejection outlet inspecting means, not shown) which detect clogging of the ejection outlets and are connected to aforesaid ink tank $T_0$, intermediate tank T, and the intermediate damper, not shown, which is an intermediate tank, and further an ink supply system comprised of ink supply pipe P. In aforesaid recording heads 3 and the ink supply system, arranged are a heating means to heat ink in the flow channel and a thermal sensor which monitors the ink temperature in the flow channel. It is required that the temperature of the recording head section is controlled at high accuracy and the others are subjected to thermal control at such a level that cleaning and ink supply are carried out as desired.

Any of several kinds of ejection outlet sensors may be employed as long as these detect clogging of outlets. For example, an ejection outlet sensor in the embodiment of the present invention is provided with a light emitting section, as well as a light receptive section which are arranged to face each other while interposing the ejection outlet. The outlet sensor detects the passage of ink droplets in such a manner that light emitted from the light emitting section to the light receptive section is shielded or not shielded by ink droplets ejected from the ejection outlet. Namely, the passage of ink droplets from the ejection outlet, which is supposed to eject ink droplets, is not detected, it is assured that the ejection outlet is clogged.

The heating means controls heating temperature so that based on the monitoring results of the thermal sensor, the temperature of ink in the flow channel is controlled to be, for example, in the range of 40–60° C. by the control section. From the viewpoint of ejection stability, preferred ejection conditions are such that as those noted above, the recording heads as well as the ink are heated to 40–60° C. and then ejected.

As shown in FIG. 1, carriage 4 reciprocates in the horizontal direction (arrow A) while guided by guide rail 6 and enables recording heads 3 to scan above the image forming surface of recording medium 2 in image forming region C. In order to cure ink ejected from recording heads 3, UV radiation source (a radiation exposure means) 41 which exposes UV radiation to a printed recording medium (a substrate) is arranged in carriage 4.

Any of several UV radiation sources 41 may be employed as long as it is capable of emitting ultraviolet radiation. For example, it is possible to use mercury lamps, metal halide lamps, excimer lamps, ultraviolet ray lasers, and LEDs.

A basic exposure method is disclosed in Japanese Patent Publication Open to Public Inspection No. 60-132767. Based on this patent, light sources are arranged on both sides of a recording head unit and the recording head and light sources are scanned employing a shuttle system. Exposure is carried out at a definite time after deposition of ink. Further, curing is completed employing another light source which is not driven. WO9954415 discloses as an exposure method a method employing an optical fiber, as well as a method in which collimated radiation strikes the mirror surface arranged on the side surface of a recording head unit and UV radiation is exposed to a recording section. In the recording method of the present invention, it is possible to use these exposure methods.

One of the preferred embodiments is one in which for example, after printing on image region C, curing is completed employing a second radiation source arranged on the downstream side in the conveying direction of the substrate.

Taking into account curability and cost of radiation sources, the present embodiment exemplifies a case in which a UV ink is applied which is cured by exposure to ultraviolet radiation. However, radiation curable ink may be applied which is cured by exposure to radiation other than ultraviolet radiation. In such cases, the radiation exposure means is not comprised of a UV radiation source, but it is possible to use various radiation sources which emit radiation (e.g., electron beams, X-rays, visible light, and infrared radiation) which cures radiation curable inks.

Incidentally, it is preferable that radiation curable ink is substantially comprised of neither water nor organic solvents. "Substantially comprised of neither water nor organic solvents", as described herein, means that the proportion of water and organic solvents is less than one percent by weight.

Herein, exposure timing of radiation is such that time between ink deposition and exposure is 0.001–2.0 seconds, is preferably 0.001–1.0 second, and is more preferably 0.01 – 0.15 second. As noted above, by controlling the time between ink deposition and exposure to be extremely short, it is possible to minimize bleeding of the deposited ink prior to curing. Further, since it is possible to expose porous recording media before ink penetrates into a deep portion which radiation does not reach, residual monomers which have not undergone reaction are minimized, whereby it is possible to reduce unpleasant odor. Thus, the use of the aforesaid ink results in great synergistic effects. Specifically, by employing ink which exhibits a viscosity of 20–500 mPa·s at 25° C., it is possible to result in the desired effects. By employing such a recording method, it is possible to control the dot diameter of ink deposited onto various recording media having different surface wettability, whereby image quality is enhanced. Incidentally, in order to form color images, it is preferable that color of low lightness is initially used and colors of higher lightness are successively overlapped. When ink of low lightness is overlapped, radiation tends not to reach the lower ink portions. As a result, the curing rate is degraded, residual monomers increase, more unpleasant odor is generated, and close contact tends to be deteriorated. Further, it is possible to carry out simultaneous exposure while emitting all colors. However, from the view point of curing enhancement, it is preferable that colors are exposed individually.

Ink preferably employed in the present invention will now be described.

Ink according to the present invention comprises colorants and at least one type of photolytically acid generating agents and thermally base generating agents, as well as photopolymerizable monomers.

As a photo cation initiator, for example, a compound applied in a chemical amplitude type photoresist or photo cation polymerization can be used, cf. "Organic materials for Imaging", ed. Organic electronics material Kenkyuu-Kai, p.p. 187–192, Bunshin Syuppan, 1993. Examples of the compound suitable for the invention are shown below.

Firstly, a salt of $B(C_6F_5)_4^-$, $PF_6^-$, $AsF_6^-$, $SbF_6^-$ or $CF_3SO_3^-$ with an aromatic onium compound such as diazonium, ammonium, iodonium, sulfonium and phosphonium can be cited.

Concrete examples of the onium compound usable in the invention are shown below.

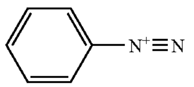
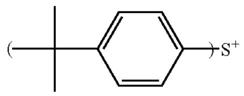
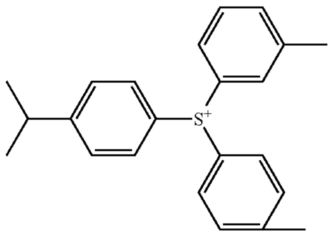
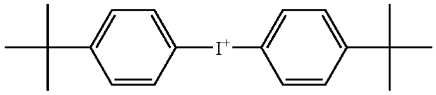
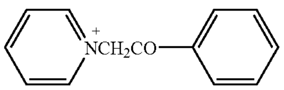
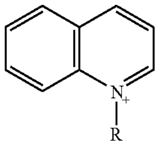

-continued
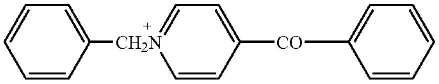
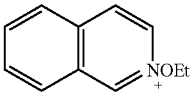
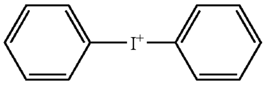
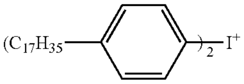
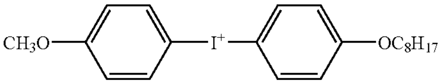
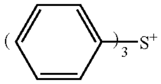
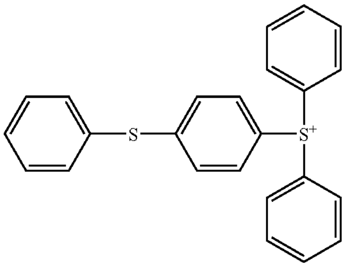
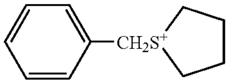
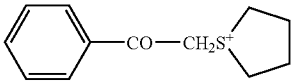
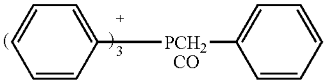
$Ph_3\overset{+}{P}CH_2CN$
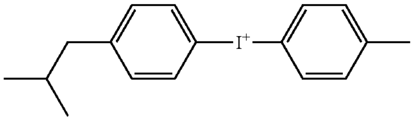
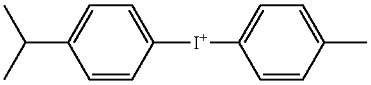
Secondary, a sulfone compound capable of generating a sulfonic acid can be cited; the concrete compounds are shown below.
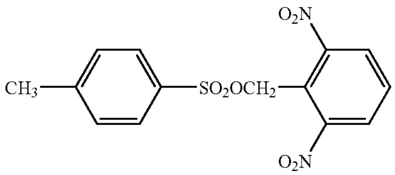
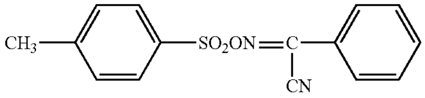
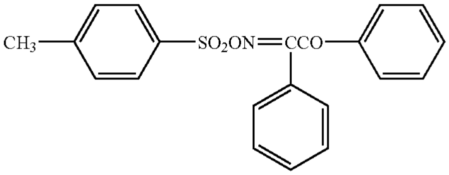
-continued
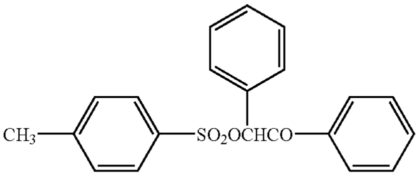
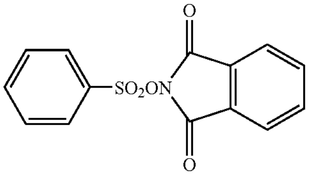
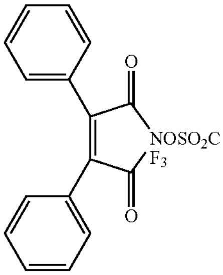
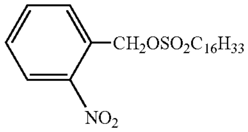
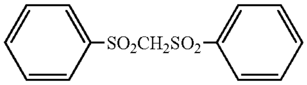
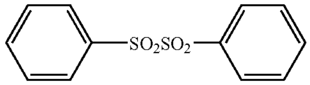
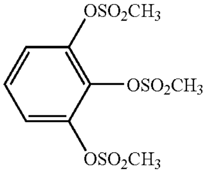
Thirdly, a halogen compound capable of generating a hydrogen halide can also be used; the concrete compounds are shown below.
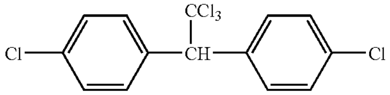
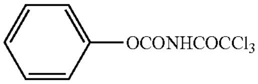
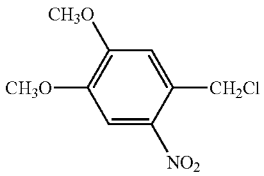
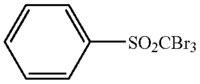
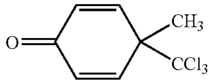
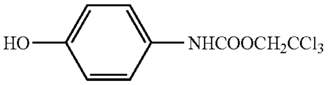

-continued

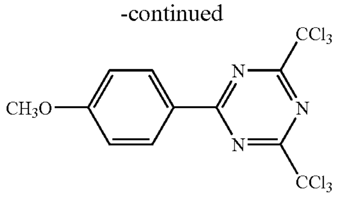

Fourthly, an iron-allene complex can be cited.

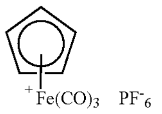

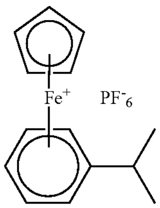

Various cationic polymerizable compounds can be used in combination as the cationic polymerizable monomer. Examples of such the monomer include epoxy compounds and vinyl ether compounds, and oxetane compounds exemplified in JP O.P.I. Nos. 6-9714, 2001-31892, 2001-40068, 2001-55507, 2001-310938, 2001-310937 and 2001-220526.

Preferred example of the aromatic epoxide is a di- or poly-glycidyl ether produced by reaction of a poly-valent phenol having at least one aromatic nucleus or an alkylene oxide adduct thereof with epichlorohydrin, such as a di- or poly-glycidyl ether of bisphenol A or an alkylene oxide adduct thereof, a di- or poly-glycidyl ether-of hydrogenised bisphenol A or an alkylene oxide adduct thereof and a novolak type epoxy resin. In the above, ethylene oxide and propylene oxide are usable as the alkylene oxide.

The aliphatic cyclic epoxide is obtained by epoxidizing a compound having at least one cycloalkane group such as cyclohexane ring and a cyclopentene ring by a suitable oxidant such as hydrogen peroxide and a peracid. A compound containing cyclohexane oxide or cyclopentene oxide is preferable.

An aliphatic poly-valent alcohol and a di- or poly-glycidyl ether of an ethylene oxide adduct thereof is cited as the preferable aliphatic epoxide. Typical examples of such the compound include diglycidyl ether of an alkylene glycol such as diglycidyl ether of ethylene glycol, diglycidyl ether of propylene glycol and diglycidyl ether of 1,6-hexanediol; a poly-glycidyl ether of poly-valent alcohol such as a di- or tri-glycidyl ether of glycerol or an alkylene oxide adduct thereof and a diglycidyl ether of propylene glycol such as a glycidyl ether of polypropylene glycol or an alkylene oxide adduct thereof. Examples of the alkylene oxide in the above-mentioned include ethylene oxide and propylene oxide.

Among the foregoing epoxides, the aromatic epoxide and the aliphatic cyclic epoxide are preferred according to the consideration on the rapid hardening property, and the aliphatic cyclic epoxide is particularly preferred. In the invention, two or more kinds of epoxidemay be used in a suitable combination even though a kind of the epoxide may be singly used.

Examples of the vinyl ether compound include a di- or tri-vinyl ether compound such as ethylene glycol di-vinyl ether, diethylene glycol di-vinyl ether, propylene glycol di-vinyl ether, dipropylene glycol di-vinyl ether, butanediol glycol di-vinyl ether, hexanediol glycol di-vinyl ether, cyclohexanedimethanol glycol di-vinyl ether and trimethylpropane tri-vinyl ether; and a mono-vinyl ether compound such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol mono-vinyl ether, n-propyl vinyl ether, isopropyl vinyl ether, isopropenyl ether-o-propylene carbonate, dodecyl vinyl ether, diethylene glycol mono-vinyl ether and octadecyl vinyl ether.

Among the vinyl ether compounds, the di- and tri-vinyl ether compounds are preferred according to consideration on the hardening ability, the contacting ability and the surface hardness; and the di-vinyl ether is particularly preferred. In the invention, two or more kinds of the foregoing vinyl ether compound may be used in a suitable combination even though a kind of the vinyl ether may be singly used.

The oxetane compound is a compound having an oxetane ring. Any known oxetane compounds such as those disclosed in JP O.P.I. Nos. 2001-220526 and 2001-310937 are usable.

When a compound having five or more oxetane rings is used, the handling of the ink is made difficult since the viscosity of the ink is become too high and the adhesiveness of the hardened material is made insufficient since the glass transition point of the ink is become too high. Accordingly, a compound having from 1 to 4 oxetane rings is preferred.

An example of the compound having one oxetane ring includes a compound represented by the following Formula 1.

Formula 1

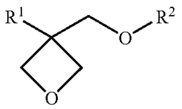

In Formula 1, $R^1$ is a hydrogen atom, an alkyl group having from 1 to 6 carbon atoms such as a methyl group, an ethyl group, a propyl group and a butyl group; a fluoroalkyl group, an allyl group, an aryl group, a furyl group or a thienyl group each having from 1 to 6 carbon atoms, $R^2$ is an alkyl group having from 1 to 6 carbon atoms such as a methyl group, an ethyl group, a propyl group and a butyl group; an alkenyl group having from 2 to 6 carbon atoms such as a 1-propenyl group, a 2-propenyl group, a 2-methyl-1-propenyl group, 2-methyl-2-propenyl group, a 1-butenyl group, a 2-butenyl group and 3-butenyl group; a group having an aromatic ring such as a phenyl group, a benzyl group, a fluorobenzyl group, a methoxybenzyl group and phenoxyethyl group; an alkylcarbonyl group having from 2 to 6 carbon atoms such as an ethylcarbonyl group, a propylcarbonyl group and a butyl carbonyl group; an alkoxycarbonyl group having from 2 to 6 carbon atoms such as an ethoxycarbonyl group, a propoxycarbonyl group, and butoxycarbonyl group; or an N-alkylcarbamoyl group having from 2 to 6 carbon atoms such as an ethylcarbamoyl group, a propylcarbamoyl group, a butylcarbamoyl group and a pentylcarbamoyl group. In the invention, a compound having one oxetane group is preferably used since the composition containing such the compound is superior in the adhesiveness and handling suitability since the composition has a low viscosity.

Examples of the compound having two oxetane rings include ones represented by the following Formula 2.

Formula 2

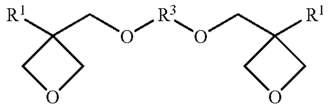

In Formula 2, $R^1$ is synonymous with $R^1$ in Formula 1; and $R^3$ is a linear- or branched-alkylene group such as an ethylene group, a propylene group and a butylenes group; a linear- or branched-poly(alkyleneoxy) group such as a poly (ethyleneoxy) group and a poly(propyleneoxy) group; a linear- or branched-unsaturated carbon hydride group such as a propenylene group, a methylpropenylene group and a butenylene group; a carbonyl group or an alkylene group containing a carbonyl group; an alkylene group or an alkylene group containing a carboxyl group; or an alkylene group containing a carbamoyl group.

As the group represented by $R^3$, a poly-valent group selected from the group represented by the following Formulas 3, 4 or 5 may be cited.

Formula 3

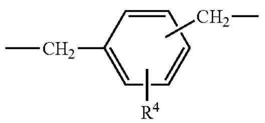

In Formula 3, $R^4$ is a hydrogen atom, an alkyl group having from 1 to 4 carbon atoms such as a methyl group, an ethyl group, a propyl group, and butyl group; an alkoxyl group having from 1 to 4 carbon atoms such as a methoxy group, an ethoxy group, a propoxy group; a halogen atom such as a chlorine atom, a bromine atom; a nitro group; a cyano group; a mercapto group; a lower alkylcarboxyl group; a carboxyl group; or a carbamoyl group.

Formula 4

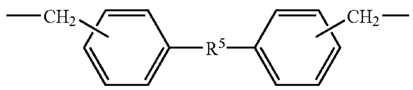

In Formula 4, $R^5$ is an oxygen atom, a sulfur atom, a methylene group, an —NH— group, an —$SO_2$ group, a $=C(CF_3)_2$ group or a $=C(CH_3)_2$ group.

Formula 5

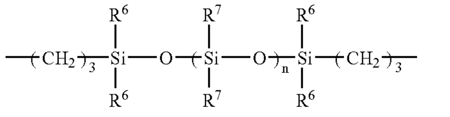

In Formula 5, $R^6$ is an alkyl group having from 1 to 4 carbon atoms such as a methyl group, an ethyl group, a propyl group and a butyl group; or an aryl group. n is an integer from 0 to 2000. $R^7$ is an alkyl group having from 1 to 4 carbon atoms such as a methyl group, an ethyl group, a propyl group and a butyl group; or an aryl group. As $R^7$, a group represented by the following Formula 6 may also be applicable.

Formula 6

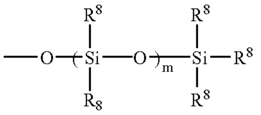

In Formula 6, $R^8$ is an alkyl group having from 1 to 4 carbon atoms such as a methyl group, an ethyl group, a propyl group and a butyl group; or an aryl group. m is an integer from 0 to 100.

Concrete examples of the compound having two oxetane rings are as follows.

Exemplified compound 1

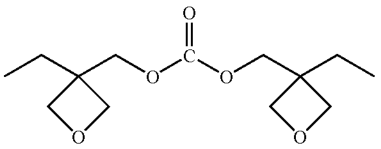

Exemplified compound 1 is a compound represented by Formula 2 in which $R^1$ is an ethyl group and $R^3$ is a carboxyl group.

Exemplified compound 2

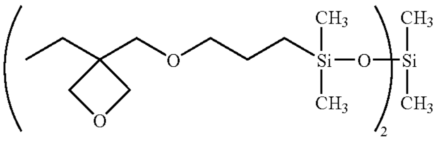

Exemplified compound 2 is a compound represented by Formula 2 in which $R^1$ is an ethyl group and $R^5$ is a group represented by Formula 5. In Formula 5, $R^6$ and $R^7$ are each a methyl group; and n is 1.

Preferable example of the compound having two oxetane rings other than the above-mentioned is a compound represented by the following Formula 7. In Formula 7, $R^1$ is synonymous with $R^1$ in Formula 1.

Formula 7

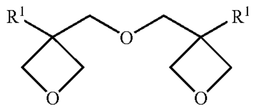

Examples of the compound having 3 to 4 oxetane rings include compounds represented by the following Formula 8.

Formula 8

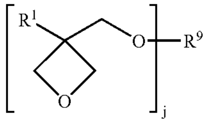

In Formula 8, $R^1$ is synonymous with $R^1$ in Formula 1.

$R^9$ is, for example, a branched-alkylene group having from 1 to 12 carbon atoms such as that represented by the following A, B, C or D, or a branched polysiloxyl group represented by the following E. j is an integer of 3 or 4.

A

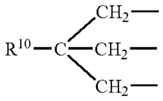

B

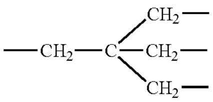

C

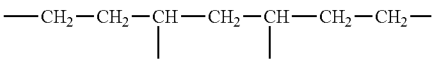

D

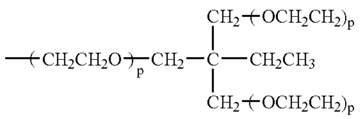

E

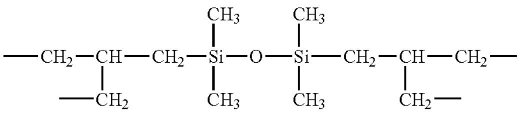

In the above A, $R^{10}$ is a lower alkyl group such as a methyl group, an ethyl group or a propyl group. In the above D, p is an integer of from 1 to 10.

An example of the compound having three or four oxetane rings is exemplified below.

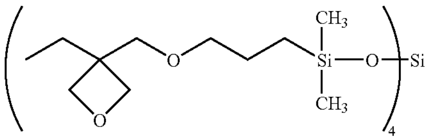

Moreover, examples of the oxetane compound having from 1 to 4 oxetane rings include compounds represented by the following Formula 10.

Formula 10

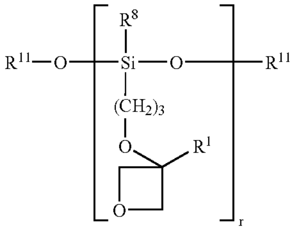

In Formula 10, $R^8$ is synonymous with $R^8$ in the foregoing Formula 6. $R^{11}$ is an alkyl group having from 1 to 4 carbon atoms such as a methyl group, an ethyl group, a propyl group and a butyl group, or a trialkylsilyl group; and r is an integer of from 1 to 4.

Concrete examples of preferable oxetane compound to be used in the invention include the following compounds.

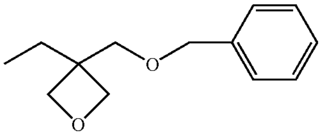

-continued

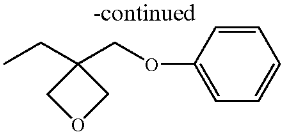

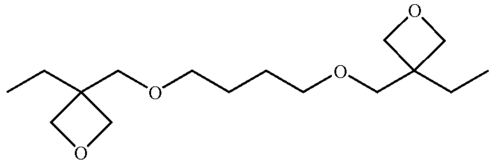

The above-mentioned compounds each having the oxetane ring can be produced by known methods without any limitation, for example, the oxetane ring synthesizing method from diol disclosed by D. B. Pattison, J. Am. Chem. Soc., 3455, 97 (1957).

Other than the above-mentioned, a compound having 1 to 4 oxetane rings and a molecular weight of from 1,000 to 5,000 is usable. Concrete examples of such the compound are as follows.

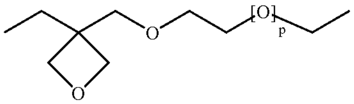

p: 20 ~ 200

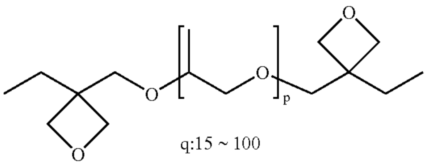

q:15 ~ 100

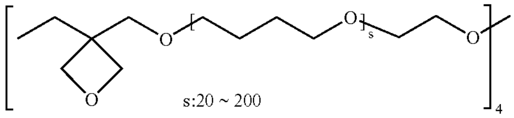

s:20 ~ 200

It is preferable to incorporate at least one of oxetane compounds and at least one of epoxy or vinylether compound as a photopolymerizable compound in the ink for the purpose of inhibiting shrinkage of the recording medium during ink hardening in the present invention.

A colorant capable of being dissolved or dispersed in the main ingredient of the polymerizable compound can be used; and a pigment is preferred from the viewpoint of the weather resistance.

The following pigments are preferably usable.

C.I. Pigment Yellow 1, 3, 12, 13, 14, 17, 81, 83, 95, 108, 109, 120, 128, 138, 139, 42, 151, 154, 180 and 181

C.I. Pigment Orange 16, 36 and 38

C.I. Pigment Red 5, 22, 38, 48:1, 48:2, 48:4, 49;1, 53:1, 57:1, 63:1, 122, 144, 146, 170, 177, 185 and 101

C.I. Pigment Violet 19 and 23

C.I. Pigment Blue 15:1, 15:3, 15:4, 18, 60, 27 and 29

C.I. Pigment Green 7 and 36

C.I. Pigment White 6, 18 and 21

C.I. Pigment Black 7

Further, in the invention, white ink is preferably utilized to increase a covering power of colors with transparent base materials such as a plastic film. It is preferable to utilize white ink, specifically in light package printing and label printing, however, due to increase of ejection amount, the using amount is naturally limited in respect to the above-mentioned ejection stability, and generation of curl and wrinkles of a recording material.

A ball mill, a sand mill, an attriter, a roll mill, an agitator, a Henschel mixer, a colloid mill, an ultrasonic homogenizer, a pearl mill, a wet jet mill and a paint shaker are usable for dispersing the pigment. A dispersant can be added at the time of dispersion of the pigment. A polymer dispersant is preferable as the dispersant. An example of the polymer dispersant is Solsperse series produced by Avecia Co., Ltd. A synergist corresponding to each of the pigments may be used as the dispersing aid. The dispersant and the dispersing aid are preferably added in a ratio of from 1 to 50 parts by weight to 100 parts by weight of the pigment. The dispersion is carried out using a solvent or the polymerizable compound as the dispersion medium. However, it is preferable that the dispersion is performed in the presence of no solvent since the irradiation hardening type ink to be used in the invention is reacted and hardened just after landing onto the recording medium. When the solvent is remained in the hardened image, problems of lowering in the solvent resistance and the VOC of the remained solvent are raised. It is preferable to select the polymerizable compound, particularly the polymerizable compound having the lowest viscosity among the monomers, as the dispersant from the viewpoint of the dispersing suitability.

The average particle diameter of the dispersion is preferably from 0.08 to 0.5 μm; it is preferable to select the pigment, the dispersant and the dispersion medium, the dispersion condition and the filtering condition so that the maximum particle diameter is to be from 0.3 to 10 μm, preferably from 0.3 to 3 μm. The nozzle blocking can be inhibited and the storage stability, the transparency and the hardening sensitivity of the ink can be maintained by such the controlling of the particle diameter.

The colorant is preferably added to the ink in an amount of from 1 to 10% by weight of the whole of the ink.

Other than the above-mentioned, a surfactant, a matting agent, and a polyester resin, a polyurethane resin, a leveling agent, a vinyl resin, an acryl resin, a rubber type resin and a wax for controlling the layer property may be added according to necessity. For improving the adhesiveness to the recording medium, addition of an extremely slight amount of organic solvent is effective. In such the case, the addition within the range in which the problems of the solvent resistance lowering and the VOC are not raised is effective; the amount of the organic solvent is from 0.1 to 5%, preferably from 0.1 to 3%. The ink may be made to a radical-cation hybrid hardening type ink by the use of a combination of a cationic polymerizable monomer.

In the image forming method of the present invention, an ink composition is ejected onto a recording material which forms images, employing an ink jet recording system.

Preferred ink ejection conditions are such that, as noted above, the recording head as well as the ink is heated to 40–60° C. to stabilize ejection. An actinic radiation curable ink exhibits a wide range of viscosity variation due to temperature variation. The resulting viscosity variation largely and directly affects the size of liquid droplets as well as the liquid ejection rate, leading to degradation of image quality. Therefore, it is required that the temperature of ink is kept constant after raising the temperature. As noted above, the control range of the ink temperature is the commonly specified temperature ±5° C., is preferably the specified temperature ±2° C., and is more preferably the specified temperature ±1° C.

EXAMPLES

The present invention will now be specifically described, but is not limited thereto.

Example 1

<<Preparation of Ink Jet Ink>>

A cyan pigment dispersion was prepared employing the formulation listed below.

| <Cyan Pigment Dispersion> | |
|---|---|
| PB15: 3 | 15 weight parts |
| Dispersing agent | 2 weight parts |
| Aron Oxetane OXT-221 (TOAGOSEI Co., Ltd.) | 83 weight parts |

Subsequently, the blending described below was carried out. The resulting blend was filtered employing a 0.8 μm membrane filter and dehydrated at 50° C. under vacuum, whereby a cyan ink was prepared.

| (Ink Formulation) | |
|---|---|
| Cyan pigment dispersion | 17 weight parts |
| Aron Oxetane OXT-221 (TOAGOSEI Co., Ltd.) | 70 weight parts |
| Seroxide 2021P (Daiseru UCB) | 30 weight parts |
| UVI-6990 (photolytically acid generating agent, manufactured by Dow Chemical Co.) | 5 weight parts |

The material quality of each member was varied and stability during printing as well as cleaning was evaluated employing the ink jet recording apparatus shown in aforesaid FIG. 1. Each evaluated member was subjected to the ink immersion test to determine the weight variation ratio by immersing each member in the aforesaid ink for one week.

The used ink jet recording apparatus comprised a recording head, comprised of a piezoelectric transducer as well as a nozzle plate subjected to a fluorine treatment as described below on the ink ejection plane. The plate constituting the ink ejection plane was prepared as follows. A 125 μm thick polyimide sheet (Ubilex, manufactured by Ube Industries, Ltd.) was subjected to an oxygen plasma treatment (13.56 MHz, 200 W, 10 Ps, over 3 minutes), was coated with the coating liquid composition described below to result in a dried layer thickness of 0.8 μm and was sintered for two hours at 330° C. to perform an ink repellence treatment.

| | |
|---|---|
| FEP dispersion (Neofulon ND-1, manufactured by Daikin Industries, Ltd.) | 10 weight parts |
| Silica sol particle dispersion (Cataloid S-30H, manufactured by Shokubai Kagaku Kogyo Co., Ltd.) | 0.02 weight part |
| Water | 90 weight parts |

Subsequently, the aforesaid nozzle plate which had been subjected to the ink repellence treatment employing aforesaid FEP underwent nozzle hole boring employing an excimer laser.

After boring the nozzle, the resulting nozzle plate was employed together with a piezoelectric transducer, whereby a recording head was prepared.

Further, ink tank $T_0$ (J Bottle Black Wide Mouthed Bottle (shielded from light), Konica Engineering) was comprised of high density polyethylene, piping from ink tank $T_0$ to intermediate ink tank T was comprised of PFA, piping from the intermediate tank to the recording head was also comprised of PFA, piping which flowed the ink suctioned from the capping member of the maintenance unit to the recovery tank, as well as piping which flowed unused ejection ink to the recovery tank (in FIG. 2, 54*a* and 53*a*, respectively) was comprised of PFA. In the cleaning member, the blade was comprised of perfluoroelastomer (Daieruperflo, manufactured by Daikin Industries, Ltd.), and the ink absorbing body was prepared employing a sponge also comprised of perfluoroelastomer. For the capping members, the capping member main body was comprised of stainless steel, and the cap wall was constituted employing elastic O rings comprised also of perfluoroelastomer (Daieruperflo, manufactured by Daikin Industries, Ltd.). Further, for the intermediate damper, the member of the main body was comprised of polyethylene, and the damper seal was comprised of PFA (Fluon (registered trade name) PFA, manufactured by Asahi Glass Co., Ltd.). Each member was tested while each material was replaced with the material described below, and printing as well as cleaning was tested.

(Capping Members)

Capping members, shown in FIGS. 1, 2, and 3, were subjected to the aforesaid immersion test employing the aforesaid ink, and any weigh variations were noted.

Conditions for the ink immersion test were such that the aforesaid ink was maintained at 60° C. and the aforesaid capping member, herein, O rings employed as the cap wall were immersed in the aforesaid ink for one week and the weight variation of each material was then determined. Incidentally, the capping member main body was comprised of metal (stainless steel) which resulted in insignificant problems of the aforesaid weight variation.

By employing the ink jet recording apparatus employing each of the materials which had been subjected to the ink immersion test as a cap wall material of the capping member, printing or suction tests were carried out.

The ink supply system of the ink jet recording apparatus was comprised of ink tank $T_0$, bright chamber ink tank T, supply pipe P, piping fitted with a filter, an intermediate damper, and a piezoelectric head. The portion to the bright chamber tank was subjected to thermal insulation and heated at 35–40° C. The temperature of the head portion was controlled to 50±3° C. Further, at an ambient temperature of 25° C., the recording head was driven so as to enable continual ink ejection to produce multi-sized dots of 4–8 pl and a resolution of 720×720 dpi. After ink deposition, within one second, ink was cured by UV radiation (at a peak wavelength of 365 nm) emitted from a mercury lamp. Illuminance on the exposed surface was set at 30 mW/cm$^2$. Incidentally, dpi, as described in the present invention, refers the number of dots per inch/2.54 cm.

Capping property (durability) during continuous use of the cap wall material, when each O ring was used instead of the aforesaid cap wall material, was evaluated based on the criteria described below.

In the ink immersion test, the aforesaid ink was employed. Each of the test members was immersed at 60° C. for one week, and subsequently the weight variation ratio was determined.

Capping property during continuous use was evaluated as follows. A molded capping member was adhered with ink and left standing. After one month, it was confirmed that by employing the resulting capping member, it was possible to carry out suction without any problems. Evaluation was performed based on the following three grades.

A: no deformation was noticed and it was possible to normally carry out capping as well as ink suction B: slight deformation was noticed, but it was still possible To normally carry out capping as well as ink suction C: it was impossible to carry out capping due to deformation Incidentally, employed as silicone rubber was SH502U, manufactured by Toray Industries, Inc., as EPDM was EPT manufactured by Mitsui Chemicals, Inc., and as perfluoroelastomer was Daieruperflo, manufactured by Daikin Industries, Inc.

The results described below were obtained as those of the ink immersion test and capping property of rubber components employed as a material of the cap wall.

| Cap Wall Material | Ink Immersion Test | Continuous Use Capping Property |
|---|---|---|
| Silicone Rubber | +128% | C |
| EPDM | +28.1% | B |
| Perfluoroelastomer | +0.1% | A |

Based on the above results, it was found that the cap wall material according to the present invention resulted in minimal degradation due to ink and exhibits excellent characteristics.

Example 2

In the aforesaid ink jet recording apparatus, employed in a cleaning member was perfluoroelastomer as a blade material in the same manner as Example 1, but the materials described below were employed instead of the aforesaid material. Subsequently, cleaning property during continuous use was evaluated.

The cleaning properties during continuous use were evaluated as follows. A sheet material was molded to a blade shape, and adhered with ink. Subsequently, after one month, it was determined that in the ink jet recording apparatus, it was easy to remove ink on the ejection plane of the nozzle without any problems. Evaluation was carried out based on the three grades described below.

A: no deformation was noticed and it was possible to carry out normal cleaning

B: slight deformation was noticed, but it was still possible To carry out normal cleaning C: it was possible to carry out cleaning due to deformation and ink remained on the ejection plane of the nozzle

| Member | Ink Immersion Test | Cleaning Property during Continuous |
|---|---|---|
| Use | +218% | C |
| Urethane Rubber | +28.1% | B |
| EDPM | +0.1% | A |
| Perfluoroelastomer | | |

Incidentally, employed as urethane rubber was urethane rubber a 70-degree hardness, manufactured by Hokushin, Corp., as EPDM was EPT, manufactured by Mitsui Chemicals, Inc., and as perfluoroelastomer was Daieruperflo, manufactured by Daikin Industries, Ltd.

Example 3

In the aforesaid ink jet recording apparatus, piping members, specifically piping 54*a* which flowed ink suctioned by capping member 51 of maintenance unit 5 shown in FIG. 2 to ink waste (recovery) tank 55, and recovery piping 53*a* which flowed accumulated ink from ink receptive section 53 which received idle ejection ink after cleaning ejection plane 32 of the recording head to recovery tank 55, were subjected to replacement with PE. Subsequently, by employing materials described below, the aforesaid ink immersion test was carried out and in each piping the state after one month ink stand-by was observed. The results are shown below.

A: no appearance change was noticed

B: deformation was noticed due to swelling

| Member | Ink Immersion Test | Test State |
|---|---|---|
| Fluorine Based Rubber | +68% | B |
| PFA | +0.0% | A |

Fluorine Base Rubber (Byton, manufactured by duPont) PFA (perfluoroalkoxyethylene copolymer, Teflon (registered trade name) PFA Tube) Example 4

In the ink jet recording apparatus shown in the aforesaid FIG. 1, film on the movable section of the intermediate damper which is one of the intermediate tanks, PFA (perfloroalkoxyethylene copolymer) film, (Teflon (registered trade name) PFA sheet, and in addition, EVCA film of the material of the damper seal (a member represented by 42*d* in FIG. 5, were subjected to the ink immersion test. Further, each member was immersed in ink for one month and subsequently each state was visually evaluated.

The state of each member was evaluated based on two levels.

| Member | Ink Immersion Test | State |
|---|---|---|
| EVA Laminate Film | +54% | B |
| PFA | +0.0% | A |

EVA Laminate Film (ethylene-vinyl acetate copolymer); film prepared by laminating PET film with Suntec (registered trade name) EVA EP1530, manufactured by Asahi Chemical Industry Co., Ltd.

PFA (perfluoroalkoxyethylene copolymer); Teflon (registered trade name) PFA sheet As noted above, it was found that materials at a weight variation ratio of less than the specified value determined by the ink immersion test according to the present invention exhibited high corrosion resistance against actinic energy curable ink, especially for cationically polymerizable ink and minimize degradation of cleaning property, capping properties as well as piping and tanks.

According to the present invention, it is possible to provide an ink jet recording apparatus which exhibits high corrosion resistance against an actinic radiation curable ink, especially for a cationically polymerizable ink and is capable of minimizing degradation of cleaning property, and capping property as well as deterioration of piping and tanks, even when employed for an extended period of time.

The invention claimed is:

1. An ink jet recording apparatus comprising:

a UV ink jet recording head fitted with a nozzle to eject UV ink;

a capping member to cap an ejection plane of the nozzle;

a cleaning member which comes into contact with the ejection plane of the nozzle to clean the ejection plane of the nozzle;

a piping member to supply a UV ink to the UV ink jet recording head or to discharge the UV ink; and an ink tank member to supply the UV ink to the UV ink jet recording head or store discharged ink, wherein a weight variation ratio of at least one of the capping member, the cleaning member, the piping member and the tank member, which is determined by an immersion test in the UV ink, is less than 50 percent.

2. The ink jet recording apparatus of claim 1, wherein the weight variation ratio of the capping member is less than 50 percent.

3. The ink jet recording apparatus of claim 2, wherein the capping member comes into contact with the ejection plane of the nozzle of the UV ink jet recording head or a member which is located on the same plane as the ejection plane of the nozzle.

4. The ink jet recording apparatus of claim 1, wherein the weight variation ratio of the cleaning member is less than 50 percent.

5. The ink jet recording apparatus of claim 1, wherein the weight variation ratio of the piping member is less than 50 percent.

6. The ink jet recording apparatus of claim 1, wherein the weight variation ratio of the tank member, is less than 10 percent.

7. The ink jet recording apparatus of claim 1 wherein at least a part of the capping member, the cleaning member, the piping member or the tank member is composed of a copolymer in which all side chains are perfluoroalkyl or perfluoroalkoxy group.

8. The ink jet recording apparatus of claim 1, which further comprises a UV radiation source.

9. The capping member of claim 8, wherein the capping member comes into contact with the ejection plane of the nozzle of the UV ink jet recording head or a member which is located on the same plane as the ejection plane of the nozzle.

10. A capping member to cap an ejection plane of the nozzle of a UV ink jet recording head, wherein a weight variation ratio of the capping member, which is determined by an immersion test in the UV ink, is less than 50 percent.

11. A cleaning member which comes into contact with the ejection plane of the nozzle of a UV ink jet recording head fitted with a nozzle to eject UV ink and carries out cleaning of the ejection plane of the nozzle, wherein a weight variation ratio of the cleaning member, which is determined by an immersion test in the UV ink, is less than 50 percent.

12. A piping member supplying UV ink to a UV ink jet recording head fitted with a nozzle to eject the UV ink or to discharge it, wherein a weight variation ratio of the piping member, which is determined by an immersion test in the UV ink, is less than 50 percent.

13. An ink tank member supplying UV ink to a UV ink jet recording head fitted with a nozzle to eject the UV ink or storing discharged ink, wherein a weight variation ratio of the ink tank member, which is determined by an immersion test in the UV ink, is less than 10 percent.

* * * * *